United States Patent
Babudri et al.

(10) Patent No.: US 7,444,543 B2
(45) Date of Patent: Oct. 28, 2008

(54) DATA CONTROL UNIT CAPABLE OF CORRECTING BOOT ERRORS, AND CORRESPONDING SELF-CORRECTION METHOD

(76) Inventors: Irene Babudri, Via Martin Luther King, 10, Burago Di Molgora (IT) 20040; Marco Roveda, Via Ticino, 33/22, Motta Visconti (IT) 20086; Rino Micheloni, Via Luini, 11, Turate (IT) 22078

( * ) Notice: Subject to any disclaimer, the term of this patent is extended or adjusted under 35 U.S.C. 154(b) by 456 days.

(21) Appl. No.: 11/149,948

(22) Filed: Jun. 9, 2005

(65) Prior Publication Data
US 2006/0062046 A1    Mar. 23, 2006

(30) Foreign Application Priority Data
Jun. 14, 2004    (EP) .................... 04425436

(51) Int. Cl.
*G06F 11/00*  (2006.01)
(52) U.S. Cl. ............................. 714/7; 714/5
(58) Field of Classification Search ............ 714/5, 714/6, 7
See application file for complete search history.

(56) References Cited

U.S. PATENT DOCUMENTS

| | | | | |
|---|---|---|---|---|
| 5,631,909 A * | 5/1997 | Weng et al. | .................. | 714/704 |
| 5,671,176 A * | 9/1997 | Jang et al. | .............. | 365/185.02 |
| 5,832,005 A | 11/1998 | Singh | ........................ | 371/51.1 |
| 5,835,695 A | 11/1998 | Noll | ....................... | 395/182.04 |
| 5,925,140 A * | 7/1999 | Hudson | ........................ | 714/52 |
| 5,964,873 A * | 10/1999 | Choi | ............................. | 713/2 |
| 6,185,696 B1 * | 2/2001 | Noll | ............................ | 714/6 |
| 6,308,265 B1 * | 10/2001 | Miller | ......................... | 713/2 |
| 6,584,559 B1 * | 6/2003 | Huh et al. | ...................... | 713/2 |
| 6,622,246 B1 * | 9/2003 | Biondi | ....................... | 713/100 |
| 6,745,329 B1 * | 6/2004 | Kao | ............................. | 726/24 |
| 6,757,838 B1 * | 6/2004 | Chaiken et al. | ................ | 714/5 |
| 6,816,986 B1 * | 11/2004 | Fanning | ....................... | 714/42 |
| 6,922,366 B2 * | 7/2005 | Micheloni et al. | ...... | 365/189.07 |
| 6,944,758 B2 * | 9/2005 | Lin | ................................ | 713/2 |
| 7,266,731 B2 * | 9/2007 | Ali-Santosa et al. | .......... | 714/42 |
| 2002/0092010 A1 | 7/2002 | Fiske | ......................... | 717/168 |

FOREIGN PATENT DOCUMENTS

DE    199 27 058 A1    12/2000
EP    0 910 020 A1    4/1999

* cited by examiner

*Primary Examiner*—Joshua A Lohn
(74) *Attorney, Agent, or Firm*—Schwabe Williamson & Wyatt

(57) ABSTRACT

A boot method for a data control unit downloads boot information from a nonvolatile memory into a temporary buffer of a boot-activation unit. A processing unit is activated by the boot-activation unit; a boot code is executed by the processing unit; and an operating code is downloaded from the nonvolatile memory into a volatile memory through the boot-activation unit. To correct possible errors in the block of the nonvolatile memory containing information and boot codes, the boot-activation unit verifies whether the boot information downloaded into its volatile memory has a critical-error condition and activates a spare memory portion of the nonvolatile memory in presence of the critical-error condition.

24 Claims, 2 Drawing Sheets

DATA CONTROL UNIT CAPABLE OF CORRECTING BOOT ERRORS, AND CORRESPONDING SELF-CORRECTION METHOD

BACKGROUND OF THE INVENTION

1. Field of the Invention

The subject of the present invention is a data control unit capable of correcting boot errors, and the corresponding self-correction method. In particular, hereinafter the term "data control unit" indicates the control unit forming a board used in devices and apparatuses provided with intelligent functions.

2. Description of the Related Art

As is known and illustrated schematically in FIG. 1, a control unit 1 is typically made up of a central processing unit (CPU, 2); a nonvolatile memory 3; and a volatile random-access memory (RAM, 4). The CPU 2 works according to an operating system (OS) that is stored in a nonvolatile way in the nonvolatile memory 3 and is loaded into the RAM 4 (preferably a SRAM) upon turning-on of the control unit 1.

In detail, the modalities of turning-on are described hereinafter. Upon power-up of the device or apparatus incorporating the data control unit, when power is supplied, a reset signal is generated, which activates switching of all the components (latches, flip-flops, registers, etc.) from an unknown state to a known state. Furthermore, the reset signal determines addressing, within the nonvolatile memory 3, of a vector (called reset vector) containing the value of a pointer to a reset-service routine, which is also stored in the nonvolatile memory 3. The address of the reset vector is fixed and is usually mapped on the first address (00 . . . 00 hexadecimal) or on the last address (FF . . . FF hexadecimal), for reasons of simplicity.

Next, the reset-service routine is executed, which initializes the CPU 2 and activates a boot routine (which is also stored in the nonvolatile memory 3). In turn, the boot routine resets the state of all the components (for example, for executing a power-on-self test (POST) and loads the code of the operating system as well as the drivers from the nonvolatile memory 3 into the RAM 4.

Once the operating system is loaded into the RAM 4, it assumes the control over the entire control unit 1.

The nonvolatile memory 3 may, for example, be a flash memory of a NOR type or, a NAND type, or a ROM.

Currently on the market there is an increasing use of flash memories of a NAND type since they offer an economic answer, as compared to flash memories of a NOR type, to the requests for high density of data and code storage. They find, in particular, advantageous application in multimedia systems, such as web browsing, video streaming, GPS services, recording of images, games, MP3 reproduction, etc.

In particular, NAND flash memories ensure high performance during programming, sequential erasing and reading, thanks to their internal paged architecture, even though they require an external RAM for executing bootstrapping.

Furthermore, NAND flash memories are structured so as to automatically download the contents of the page "0" upon power-up, without the need for an appropriate read command to be generated.

In fact, as soon as the supply voltage exceeds a threshold voltage such as to guarantee execution of the normal operations, the page 0 is retrieved and copied into a buffer.

The boot operations occur normally according to two modalities: a boot-loader method and a boot-engine method.

In the first case, the boot-loader method (see also FIG. 2), the nonvolatile memory comprises two parts: a ROM 10, of small dimensions (e.g., approximately 20 KB), which stores the reset vector and the boot loader, and a NAND 11, of larger dimensions, which stores the operating code and the application data. Generally, the ROM 10 is made in a same device integrated with the CPU 12, for example a microcontroller; the RAM 13 here is preferably a DRAM so as to be able to satisfy the requirements of density existing in multimedia systems.

In the second case, the boot-engine method (see FIG. 3), a hardware circuit is provided (called boot engine, designated by 15), which controls the bootstrapping operations. The boot engine 15 can be integrated with the CPU 16 to form a microcontroller, as represented by the dashed block, or else may be an external component or again be integrated with the NAND 17. Specifically, the boot engine 15 comprises an executive portion ("download engine") and a temporary memory portion ("boot buffer"), while the NAND 17 stores the reset vector, the boot code, and the operating system.

Initialization of the control unit is described hereinafter. Upon receipt of the reset signal, the boot engine 15 freezes the CPU 16; then, it downloads the reset vector and the boot code from the NAND 17 and stores them in its boot buffer. Next, the boot engine 15 awakes the CPU 16, which executes the boot code and downloads the operating code into the RAM 18 (also here, a DRAM).

Both of the methods described above (boot-loader method and boot-engine method) are affected by reliability problems, due to bad memory blocks. Already when they leave the factory, a small percentage of blocks can be non-functioning; in this case, they are marked as "bad blocks" and are no longer available for use. During the life of the control unit, other blocks can go bad; consequently, the system comprises a software module (called bad-block manager), which highlights the onset of a failure and keeps a table of the unusable blocks updated. This routine cannot, however, work on the block 0 since it is not yet active during bootstrapping.

Because of the extreme importance of the block 0 for execution of the bootstrapping operation, as described above, only memories that have a functioning block 0 are put on the market, but there is no way of guaranteeing that this will remain so throughout the life of the control unit. On the other hand, the failure of even just one bit of the block 0 can bring about crashing of the entire system.

Consequently, the need exists of ensuring, on the one hand, that the data read are correct, and on the other, that the data control unit is able to function even when the block 0 containing the boot code is bad.

Currently, in general, nonvolatile memories, in particular NAND flash memories, require an algorithm for correcting errors, called error-correction code (ECC), which is able to correct a certain number of errors. The exact number of errors that can be corrected in the individual cases is determined according to the statistical knowledge of the susceptibility of the memory to errors. For example, typical ECC systems for current NAND memories are able to correct up to three errors. To do this, added to each datum is redundant information such as to enable not only the detection of the presence of errors, but also their correction and the reconstruction of the original correct datum. However, even this algorithm cannot act on the block 0 during bootstrapping and hence cannot guarantee the functionality of said block for the entire life of the control unit.

BRIEF SUMMARY OF THE INVENTION

One embodiment of the invention provides an improved control unit that is able to overcome the disadvantages of the known art.

One embodiment of the invention is directed to a data control unit that includes a processing unit, a nonvolatile memory, and a boot-activation unit connected to the processing unit and the nonvolatile memory. The nonvolatile memory includes a first portion of memory configured for storing boot information, a second portion of memory configured for storing an operating system, and a spare memory portion. The boot-activation unit includes:

a temporary-memory portion configured for temporarily storing the boot information, a detector configured to detect a critical-error condition in the boot information, and a redundancy activator configured to activate the spare memory portion in presence of the critical-error condition.

BRIEF DESCRIPTION OF THE SEVERAL VIEWS OF THE DRAWING(S)

For an understanding of the present invention there is now described a preferred embodiment thereof, purely by way of non-limiting example, with reference to the attached drawings, wherein.

DETAILED DESCRIPTION OF THE INVENTION

Figure 1:
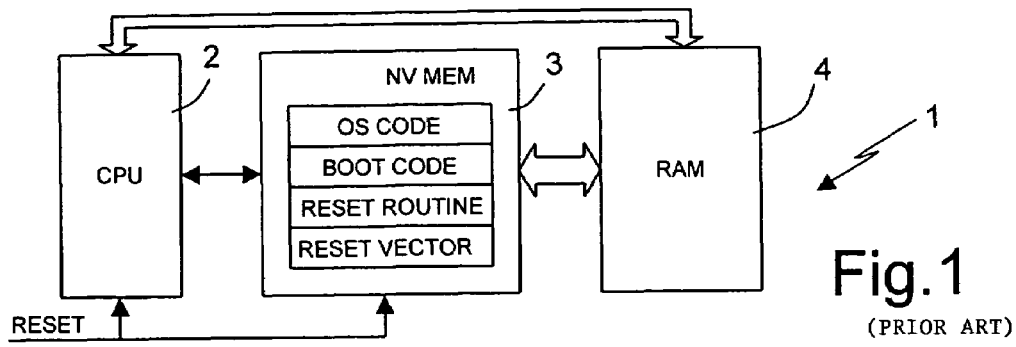
FIG. 1 shows a generic block diagram of a known control unit.
Figure 2:
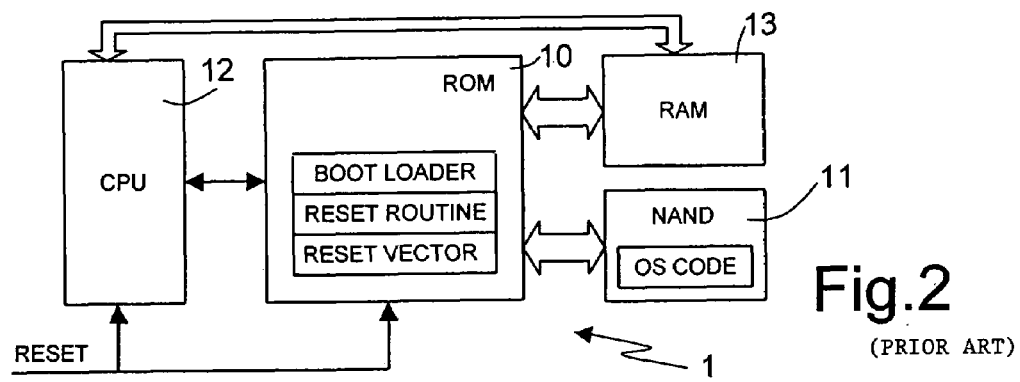
FIG. 2 shows a block diagram of a first known implementation of a control unit based upon a NAND flash memory.
Figure 3:
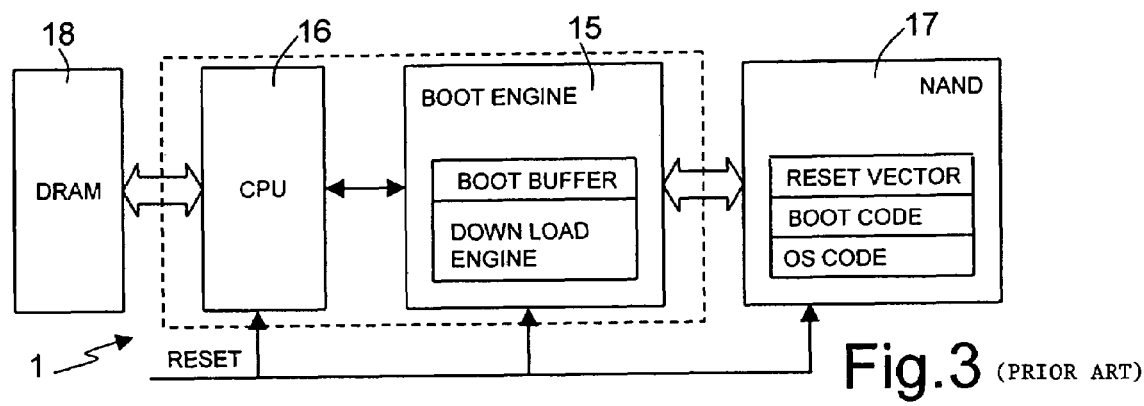
FIG. 3 is a block diagram of a second known implementation of a control unit based upon a NAND flash memory.
Figure 4:
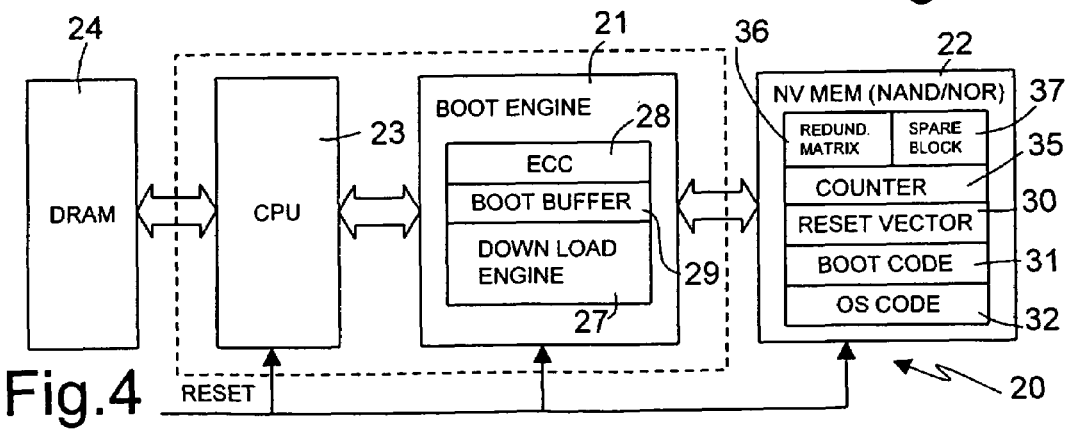
FIG. 4 shows a block diagram of a control unit capable of self-correcting errors in the boot portion, according to the invention.

FIG. 4 illustrates a block diagram of a control unit 20 provided with a boot engine 21. The control unit 20 moreover comprises a nonvolatile memory 22, a CPU 23, and a RAM 24.

The boot engine 21 is also here integrable with the CPU 23 to form a microcontroller, as represented by the dashed block, or else it may be an external component or again be integrated with the nonvolatile memory 22. Specifically, the boot engine 22 comprises a first executive portion ("download engine" 27), a second executive portion (ECC routine 28), and a memory portion ("boot buffer" 29). The ECC routine can be any known one that is able to detect and correct a preset number of errors, as explained below.

The nonvolatile memory 22, typically a NAND memory, but also a NOR memory or other nonvolatile memory that is susceptible to failure in the blocks storing the information and the boot codes), stores the reset vector (block 30), the boot code (block 31), the operating system (block 32), an error counter 35, a redundancy matrix 36, and one or more spare blocks 37 (only one thereof being illustrated in the figure).

The RAM 24 is also here preferably a DRAM.

Figure 5:
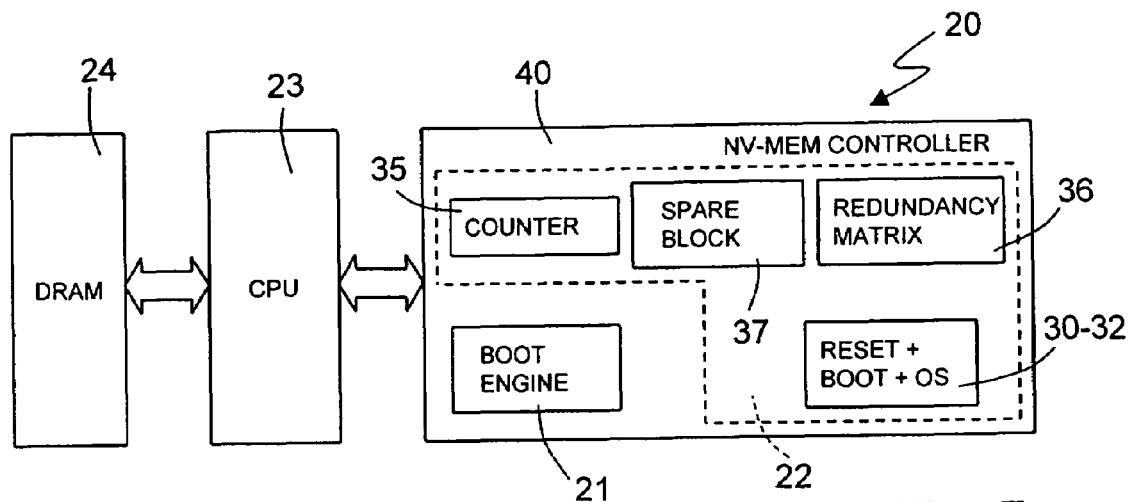
FIG. 5 shows a block diagram of a different embodiment of the control unit.

FIG. 5 shows a variant of the control unit 20, in which the boot engine 21 is integrated together with the nonvolatile memory 22 in a controller 40.

With the architecture of FIGS. 4 and 5, during bootstrapping, the ECC in the boot engine 21 is able to detect the presence and to correct any errors in the block 0 of the nonvolatile memory 22. Furthermore, upon detection of a new error, the boot engine 21 updates the error counter 35 provided in the nonvolatile memory 22 and verifies whether the number of errors present is critical (i.e., close to the threshold of correctability of the system); in this case, the boot engine 21 activates the redundancy.

In fact, the ECC is able to correct a number of errors (normally depending upon the technology) that is preset in the fabrication stage, being based upon redundancy systems. Upon detection of a (new) error, also on the basis of the number of errors previously detected, the boot engine 21 can know whether the ECC is able to correct further errors or not; on the other hand, the errors generally occur one at a time rather than simultaneously. In general, in any case, from a knowledge of the likelihood of more than one error occurring at a time, it is possible to fix a critical value, which, once exceeded, means that there is the risk of no longer being able to correct further errors (critical-error condition). For example, if the probability of more than one error occurring at a time is negligible, the safety limit can be fixed equal to the maximum number of errors that can be corrected (for example, if four is the maximum number of errors that can be corrected, upon detection, and correction, of the fourth error redundancy is activated); instead, if said probability is not negligible, it is appropriate to fix the safety limit at a smaller value (in the example given above, for instance upon detection of the third error).

The redundancy can be activated in any known way, for example using the sector redundancy described in EP-A-1 365 419, which is incorporated herein by reference in its entirety.

In particular, in the specific case, redundancy can occur according to two different modalities. For example, upon detection of the critical condition, it is possible to copy the contents of the block 0 into the spare block 37. The copy obviously must take into account the correction of the data performed by the ECC, so as to write correct data (in practice, restarting from a zero-error condition). Alternatively, the data of the block 0 can be written in the spare block 37 already when programming the nonvolatile memory 22. In this second case, no copy is made at the moment of detection of the critical condition.

Next, the redundancy matrix 36 is updated, which stores the information of the address of the spare block 37.

Consequently, whether the contents of the block 0 are copied upon detection of the critical condition or whether it has been loaded in the factory, the spare block 37 is mapped in the same space as the addresses of the original portion and, starting from the subsequent turning-on of the control unit 20, bootstrapping takes place by reading the spare block 37 instead of the original one.

Of course, the spare block 37 must be guaranteed as functioning properly ("good") at the moment of entry on the market; consequently, upon activation of the redundancy, the spare block 37 (whether written upon detection of the critical condition or written originally) is good and enables a correct operation of the control unit 20 also in the case of subsequent onset of errors in the boot portion.

The replacement of the block 0 can be rendered automatic (controlled by the boot engine 21) or can be controlled by the user, who can thus maintain control of each step and send the correct sequence of commands and instructions.

For the rest, the booting step follows the modalities already described with reference to FIG. 4.

Figure 6:
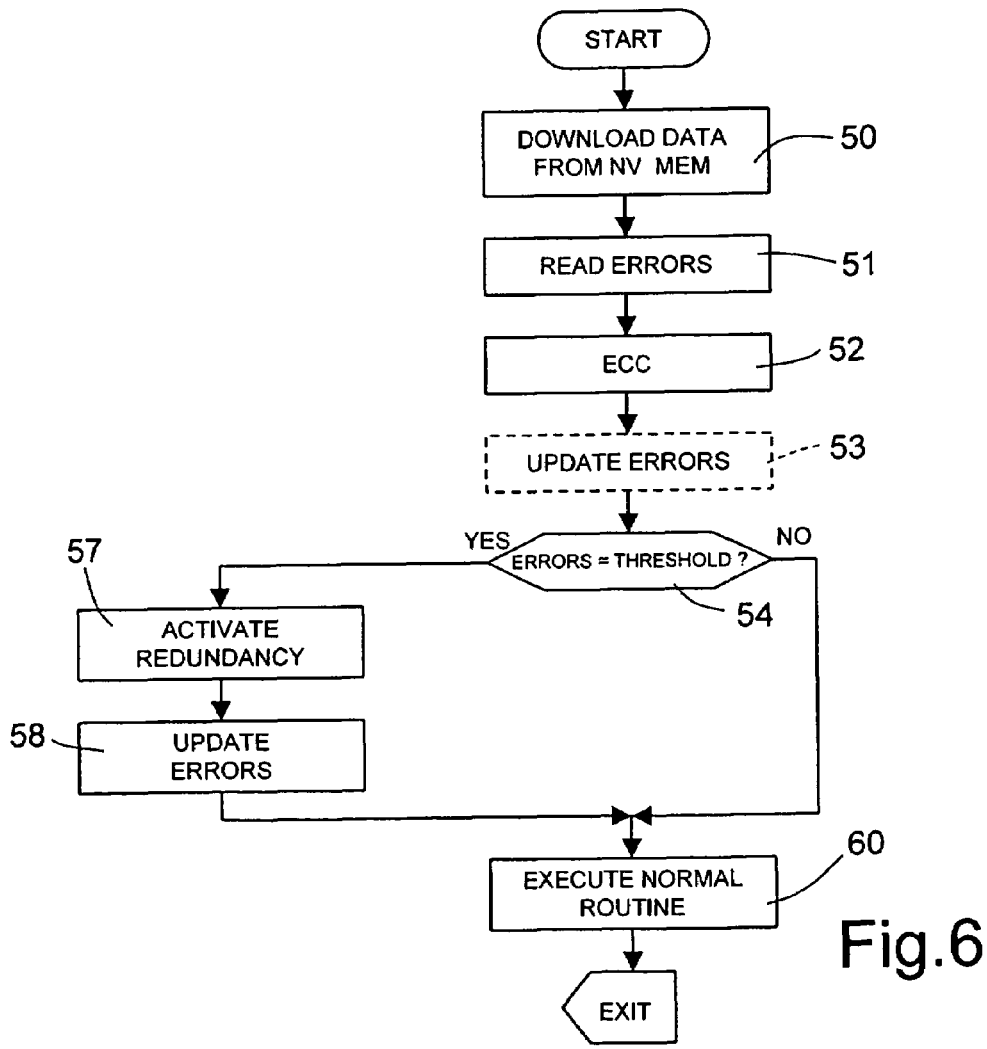
FIG. 6 shows a flowchart corresponding to the self-correction method according to the invention.

A flowchart of the correction method is illustrated in FIG. 6 and initially comprises: downloading the reset vector and of the boot code from the nonvolatile memory 22 into the boot buffer 29 of the boot engine 21, step 50; reading the number of errors previously detected by the counter 35, step 51; executing the ECC for detecting and possibly correcting the errors, step 52; possibly updating the number of errors, step 53; verifying whether the updated number of errors has reached the preset threshold value (critical condition), step 54; if not (output NO from step 54), executing the normal activities (executing the bootstrapping operation, etc.), step 60; otherwise (output YES from step 54), activating redundancy, as described above (copying the block 0 into the spare block 37 or enabling the spare block 37, and updating the redundancy matrix 36), step 57; updating the error counter 35, step 58; and executing the normal activities, step 60.

The advantages of the described control unit and self-correction method are the following. First, they guarantee correction of errors and hence functionality of the control unit also in presence of multiple errors on the block 0 of the nonvolatile memories, thus considerably prolonging the life of the control unit. This is due to the activation of redundancy when it is still possible to recover the original information either from the original block 0 (thanks to the correction of the errors) or to the activation of a spare portion that is certainly good. This enables use, in the data control unit, also of storage devices subject to a non-negligible probability of error in the course of their life (normally devices built using less reliable, but more economically advantageous technologies), reducing the cost of the control unit. This may be achieved also because the necessary additional components (both hardware, blocks 35-37, and software, ECC) do not sensibly affect the total cost of the control unit.

Finally, it is clear that numerous modifications and variations can be made to the control unit and to the method described and illustrated herein, all falling within the scope of the invention as defined in the annexed claims. For example, by providing an appropriate number of spare blocks and sectors, the redundancy procedure can be repeated a number of times, theoretically prolonging infinitely the life of the control unit, at least as regards bootstrapping errors.

The invention claimed is:

1. A data control unit, comprising:
a processing unit;
a nonvolatile memory comprising a first portion of memory configured for storing boot information, a second portion of memory configured for storing an operating system, and a spare memory portion; and
a boot-activation unit connected to said processing unit and said nonvolatile memory, said boot-activation unit comprising:
a temporary-memory portion connected between said processing unit and said nonvolatile memory and configured for temporarily storing said boot information downloaded from said nonvolatile memory,
detection means configured for detecting a critical-error condition in said boot information before said boot information is sent from said boot-activation unit to said processing unit to activate said processing unit, and
redundancy-activation means for activating said spare memory portion in presence of said critical-error condition.

2. The data control unit according to claim 1, wherein said detection means comprises an error-correction module, using an error-correction code.

3. The data control unit according to claim 2, wherein said detection means comprises means for comparing a detected number of errors with a threshold value.

4. The data control unit according to claim 3, wherein said threshold value is equal to a maximum number of errors that can be corrected by said error-correction code.

5. The data control unit according to claim 3, wherein said threshold value is lower than a maximum number of errors that can be corrected by said error-correction code.

6. The data control unit according to claim 1, wherein said nonvolatile memory comprises an error counter storing a number of detected errors.

7. The data control unit according to claim 1, wherein said nonvolatile memory comprises a redundancy matrix configured so as to address said spare memory portion when activated by said redundancy-activation means.

8. The data control unit according to claim 1, wherein said nonvolatile memory is a NAND flash memory or a NOR flash memory.

9. A boot method for a data control unit, comprising the steps of:
downloading boot information from a nonvolatile memory to a temporary buffer of a boot-activation unit;
activating a processing unit by said boot-activation unit;
executing a boot code by said processing unit;
downloading an operating code from said nonvolatile memory into a volatile memory through said boot-activation unit;
verifying whether said boot information has a critical-error condition; and
activating a spare memory portion of said nonvolatile memory in presence of said critical-error condition.

10. The method according to claim 9, wherein said step of verifying comprises executing an error-correction code on said boot information for generating correct information.

11. The method according to claim 10, wherein said step of executing an error-correction code comprises comparing a detected number of errors with a threshold value.

12. The method according to claim 11, wherein said threshold value is equal to a maximum number of errors that can be corrected by said error-correction code.

13. The method according to claim 11, wherein said threshold value is lower than a maximum number of errors that can be corrected by said error-correction code.

14. The method according to claim 9, comprising the step of updating an error counter in said nonvolatile memory.

15. The method according to claim 9, comprising the step of updating a redundancy matrix so as to address said spare memory portion.

16. The method according to claim 9, comprising the step of copying said boot information into said spare memory portion.

17. The method of claim 16, wherein copying said boot information into said spare memory portion is performed in response to detecting that said boot information has the critical-error condition.

18. A data control unit, comprising:
a processing unit;
a nonvolatile memory having a first memory portion that stores boot information and a spare memory portion that stores a copy of the boot information; and
a boot-activation unit connected to the processing unit and the nonvolatile memory, the boot-activation unit comprising:
an error detector structured to detect a critical-error condition in the boot information before the boot information is sent from the boot-activation unit to the processing unit to activate the processing unit, and a redundancy-activator structured to activate the spare memory portion in presence of the critical-error condition.

19. The data control unit according to claim 18, wherein the error detector comprises an error-correction module that uses an error-correction code to correct an error detected by the error detector.

20. The data control unit according to claim 19, wherein the error detector comprises comparing means for comparing a detected number of errors with a threshold value; wherein if the detected number of errors is less than the threshold value, the comparing means causes the error-correction module to correct the errors; and if the detected number of errors is greater than the threshold value, the comparing means causes the redundancy-activator to activate the spare memory portion so that the boot-activation unit uses the boot information stored in the spare memory portion to boot the data control unit.

21. The data control unit according to claim 18, wherein the nonvolatile memory comprises a redundancy matrix configured so as to address the spare memory portion when activated by the redundancy-activator.

22. The data control unit according to claim 18, wherein the nonvolatile memory is a flash memory.

23. The data control unit according to claim 18, wherein the boot-activation unit includes a temporary-memory portion configured for temporarily storing the boot information.

24. The data control unit according to claim 18, wherein the nonvolatile memory includes a second memory portion that stores an operating system.

* * * * *